US009965467B2

(12) United States Patent
Dharmarajan Mary

(10) Patent No.: US 9,965,467 B2
(45) Date of Patent: May 8, 2018

(54) SIGN LANGUAGE COMMUNICATION WITH COMMUNICATION DEVICES

(71) Applicant: Avaya Inc., Santa Clara, CA (US)

(72) Inventor: Dhanuj Dharmarajan Mary, Trivandrum (IN)

(73) Assignee: Avaya Inc., Santa Clara, CA (US)

( * ) Notice: Subject to any disclaimer, the term of this patent is extended or adjusted under 35 U.S.C. 154(b) by 33 days.

(21) Appl. No.: 15/083,111

(22) Filed: Mar. 28, 2016

(65) Prior Publication Data
US 2017/0277684 A1 Sep. 28, 2017

(51) Int. Cl.
| | |
|---|---|
| *G06F 17/28* | (2006.01) |
| *G06K 9/00* | (2006.01) |
| *G10L 21/10* | (2013.01) |
| *G06F 3/01* | (2006.01) |
| *G06F 3/14* | (2006.01) |
| *G09B 21/00* | (2006.01) |
| *H04M 1/725* | (2006.01) |
| *G10L 21/06* | (2013.01) |

(52) U.S. Cl.
CPC .......... *G06F 17/2836* (2013.01); *G06F 3/017* (2013.01); *G06F 3/14* (2013.01); *G06F 17/289* (2013.01); *G06K 9/00355* (2013.01); *G09B 21/009* (2013.01); *G10L 21/10* (2013.01); *G06F 17/2872* (2013.01); *G10L 2021/065* (2013.01); *H04M 1/72552* (2013.01); *H04M 1/72555* (2013.01); *H04M 1/72591* (2013.01)

(58) Field of Classification Search
CPC combination set(s) only.
See application file for complete search history.

(56) References Cited

U.S. PATENT DOCUMENTS

| | | | |
|---|---|---|---|
| 8,428,643 B2* | 4/2013 | Lin | G06F 3/017 379/52 |
| 2010/0121629 A1* | 5/2010 | Cohen | G06F 17/28 704/2 |
| 2014/0046661 A1* | 2/2014 | Bruner | H04N 21/4884 704/235 |

\* cited by examiner

*Primary Examiner* — Vu B Hang
(74) *Attorney, Agent, or Firm* — IP Spring

(57) ABSTRACT

Implementations enable conversations between operators of communication devices who use sign language and other operators who don't. A method may include receiving images of first sign language gestures captured by a camera of a first communication device, converting the first sign language gestures into first text, transmitting the first text to a second communication device, receiving second text from the second communication device, and converting the second text into images of second sign language gestures made by an avatar. The method may also include operating the camera to capture the images of the first sign language gestures and presenting the images of the second sign language gestures on a display of the first communication device. The method may further include receiving first speech captured at the second communication device, converting the first speech into third text, and then into images of third sign language gestures made by the avatar.

20 Claims, 11 Drawing Sheets

SIGN LANGUAGE COMMUNICATION WITH COMMUNICATION DEVICES

BACKGROUND

Despite current day societal accommodations for deaf people, including current day supportive laws and removal of stigma associated with being deaf, deaf people are still often caused to feel isolated from the vast majority of others who are able to hear. Much of this is caused by the fact that the vast majority of hearing persons never learn sign language. As a result, in-person conversations between hearing and deaf persons often entail the awkward and time-consuming use of handwritten text on exchanged pieces of paper and/or pointing at objects.

Such barriers to communication between hearing and deaf persons also extend into electronic communications, and can become more severe. Despite the growing widespread use of two-way video communications, conversations between hearing and deaf persons through electronic communication devices often entail time-consuming exchanges of typed text.

SUMMARY

A computer-implemented method to enable sign language communication through communication devices, the method may include receiving, by a processor, images of first sign language gestures captured by a camera of a first communication device; converting, by the processor, the first sign language gestures into first text; transmitting the first text to a second communication device; receiving second text from the second communication device; and converting, by the processor, the second text into images of second sign language gestures made by an avatar.

The computer-implemented method may further include operating the camera to capture the images of the first sign language gestures and presenting the images of the second sign language gestures on a display of the first communication device.

The computer-implemented method may further include generating training data that correlates third sign language gestures to a corrected interpretation of the third sign language gestures, where generating training data includes operating the camera to capture images of the third sign language gestures; interpreting the third sign language gestures; receiving, at the first communication device, the corrected interpretation of the third sign language gestures; and storing the training data within a storage of the first communication device for use in the conversion of the first sign language gestures into the first text.

The computer-implemented method may further include receiving, by the processor, first speech captured at the second communication device; converting, by the processor, the first speech into third text; and converting, by the processor, the third text into images of third sign language gestures made by the avatar. The computer-implemented method may still further include converting, by the processor, the first sign language gestures into second speech; and transmitting the second speech to the second communication device.

The computer-implemented method of claim may further include receiving the images of the first sign language gestures from the first communication device via a network, and transmitting the images of the second sign language gestures to the first communication device via the network to enable presentation of the images of the second sign language gestures on a display of the first communication device. The computer-implemented method of claim may still further include receiving, at a connection server, a request from one of the first communication device and the second communication device to communicate with another of the first communication device and the second communication device; receiving, at the connection server, indications from the first communication device that the first communication device is operated by an operator who uses sign language and that the first communication device comprises the camera and the display; and in response to the request and the indications, routing communications between the first and second communication devices, performing the conversion from the first sign language gestures into the first text at the connection server, and performing the conversion from the second text to the second sign language gestures at the connection server. Alternatively or additionally, the computer-implemented method may still further include receiving, at a connection server, indications from each communication device of a plurality of communication devices that each communication device of the plurality of communication devices is associated with an organization and that each communication device of the plurality of communication devices is operated by an operator who does not use sign language; receiving, at the connection server, a request from the first communication device to communicate with a communication device of the plurality of communication devices; receiving, at the connection server, indications from the first communication device that the first communication device is operated by an operator who uses sign language and that the first communication device comprises the camera and the display; determining that none of the communication devices of the plurality of communication devices is operated by an operator who uses sign language; and in response to the request, the indications and the determination, selecting a communication device from among the plurality of communication devices that is indicated as available and operated by an available operator as the second communication device and routing communications between the first communication device and the selected communication device.

A non-transitory machine-readable medium may include instructions stored thereon that, when executed by a processor, may cause the processor to receive images of first sign language gestures captured by a camera of a first communication device; convert the first sign language gestures into first text; transmit the first text to a second communication device; receive second text from the second communication device; and convert the second text into images of second sign language gestures made by an avatar.

The processor may be further caused to operate the camera to capture the images of the first sign language gestures and present the images of the second sign language gestures on a display of the first communication device. The processor may be still further caused to generate training data that correlates third sign language gestures to a corrected interpretation of the third sign language gestures, in which the processor may be still further caused to operate the camera to capture images of the third sign language gestures, interpret the third sign language gestures, receive the corrected interpretation of the third sign language gestures, and store the training data within a storage of the first communication device for use in the conversion of the first sign language gestures into the first text.

The processor may be further caused to receive first speech captured at the second communication device, convert the first speech into third text, and convert the third text into images of third sign language gestures made by the avatar. The processor may be still further caused to convert the first sign language gestures into second speech, and transmit the second speech to the second communication device.

The processor may be further caused to receive the images of the first sign language gestures from the first communication device via a network, and transmit the images of the second sign language gestures to the first communication device via the network to enable presentation of the images of the second sign language gestures on a display of the first communication device. The processor may be still further caused to receive a request from one of the first communication device and the second communication device to communicate with another of the first communication device and the second communication device; receive indications from the first communication device that the first communication device is operated by an operator who uses sign language and that the first communication device comprises the camera and the display; and in response to the request and the indications, route communications between the first and second communication devices, perform the conversion from the first sign language gestures into the first text, and perform the conversion from the second text to the second sign language gestures.

An apparatus to enable sign language communication through communication devices, the apparatus may include a processor and a storage coupled to the processor to store instructions. When executed by the processor, the instructions may cause the processor to receive images of first sign language gestures captured by a camera of a first communication device, convert the first sign language gestures into first text, transmit the first text to a second communication device, receive second text from the second communication device, and convert the second text into images of second sign language gestures made by an avatar.

The processor may be further caused to operate the camera to capture the images of the first sign language gestures and present the images of the second sign language gestures on a display of the first communication device.

The processor may be further caused to receive first speech captured at the second communication device, convert the first speech into third text, and convert the third text into images of third sign language gestures made by the avatar. The processor may be still further caused to convert the first sign language gestures into second speech and transmit the second speech to the second communication device.

The processor may be further caused to receive the images of the first sign language gestures from the first communication device via a network and transmit the images of the second sign language gestures to the first communication device via the network to enable presenting of the images of the second sign language gestures on a display of the first communication device.

BRIEF DESCRIPTION OF THE DRAWINGS

This disclosure is illustrated by way of example, and not by way of limitation, in the accompanying figures in which like reference numerals are used to refer to similar elements.

DETAILED DESCRIPTION

Figure 1:
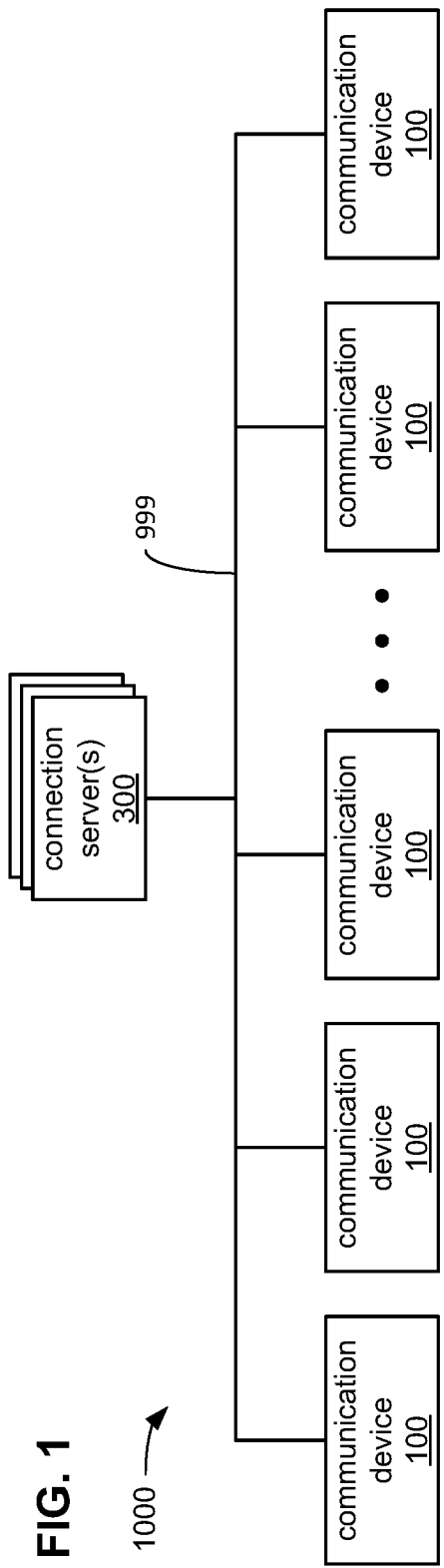
FIG. 1 illustrates an example implementation of a communication system according to at least some embodiments.

Various implementations of a method include capturing images (e.g., captured motion video) of a first operator of a first communication device making sign language gestures, converting the sign language gestures into text, and presenting the text generated by the conversion to a second operator of a second communication device. Implementations of the method may further include converting the generated text into speech and presenting the speech to the second operator. Implementations of the method may further include receiving text entered by the second operator, generating images (e.g., motion video animation) of an avatar making sign language gestures based on the entered text, and presenting the avatar making sign language gestures to the first operator. Implementations of the method may further include capturing speech of the second operator, converting the captured speech into text, generating images of an avatar making sign language gestures therefrom, and presenting the avatar making sign language gestures to the first operator. Various implementations of a communication device, a connection server and/or of a communication system that includes the communication device may perform the method. More precisely, a communication device and/or a connection may perform one or both of converting captured images of an operator making sign language gestures (e.g., captured motion video) into text and of converting text into images of an avatar making sign language gestures (e.g., motion video animation).

Various implementations of a communication system enable conversations between operators of communication devices who use sign language and other operators of communication devices who do not. It should be noted that operators of communication devices who use sign language may use do so as a result of being deaf or otherwise hearing impaired, and/or may do so as a result of being in a situation in which verbal conversations are not possible (e.g., a noisy construction environment, an underwater environment where breathing apparatus is required, etc.). It should also be noted that the images captured of an operator making sign language gestures for subsequent conversion of sign language to text may include captured motion video (e.g., multiple images captured as motion video frames at a predetermined frame rate) of the operator forming the sign language gestures. It should be further noted that the images of an avatar making sign language gestures for presentation to an operator may include motion video animation (e.g., multiple images presented as motion video frames at a predetermined frame rate) of the avatar forming the sign language gestures.

A first communication device operated by a first operator who uses sign language may convert captured images of sign language gestures made by the first operator (e.g., captured motion video of the first operator) into text transmitted to a second communication device operated by a second operator who does not use sign language. The first communication device may also convert text received from the second communication device into sign language gestures based on that text that the first communication device may present to the first operator on a display with an avatar that performs the sign language gestures (e.g., motion video animation of the avatar). Alternatively or additionally, a connection server interposed between the first and second communication devices may perform one or both of the conversions in either direction between sign language and text. Regardless of whether the first communication device and/or the connection server performs either or both conversions, the second communication device may present the text generated from the captured sign language gestures of the first operator to the second operator on a display. The second communication device may also receive, from the second operator via an input device, the text to be converted into sign language gestures for presentation to the first operator using the avatar. Alternatively or additionally, the connection server and/or the second communication device may convert the text generated from the captured sign language gestures of the first operator into speech to be played to the second operator by the second communication device. Either the second communication device or the connection server may convert captured speech of the second operator into the text that is to be converted into the sign language gestures to be presented to the first operator.

The communication devices and the connection server may be components of a communication system such as a telecommunications network, an internal network of a business or other organization that covers a relatively confined physical location (e.g., within a single building), and/or at least a portion of the Internet. In such a communication system, the connection server may provide communications services between communication devices for which fees may be charged and/or as a private service limited to being provided to members of an organization. Operators of communication devices may have accounts with the organization that operates at least the connection server, which may store account information for each operator to enable identification and/or authentication of each operator.

The first communication device may incorporate or be coupled to a camera to capture sign language gestures made by the first operator, and/or a display on which the avatar presents sign language gestures to the first operator to enable the first operator to converse with the second operator using sign language. The first communication device may additionally include or be coupled to an input device, such as a keyboard and/or pointing device, to enable initiation of communications with the second communication device, such as entering an identifier associated with the second communication device (e.g., a telephone number, a social network handle name, an email address, etc.). The second communication device may incorporate and/or be coupled to a display and an input device, such as a keyboard or pointing device, to enable the second operator to converse with the first operator using text. Alternatively or additionally, the second communication device may incorporate and/or be coupled to a microphone and a speaker to enable the second operator to converse with the first operator using speech.

In preparation for interpreting the sign language gestures made by the first operator, the first communication device or the connection server may operate in a training mode to learn idiosyncrasies of the first operator in making sign language gestures. In such a training mode, the first operator may make a number of sign language gestures of their choosing and/or may be guided through making a selection of sign language gestures within a field of view of a camera of the first communication device. The first communication device or the connection server may interpret these sign language gestures, and may indicate the result interpretations to the first operator to enable the first operator to indicate the correctness of those interpretations. Such indications of the interpretation results may be presented to the first operator on a display of the first communication device as text and/or with an avatar resembling a person or other character or creature making sign language gestures. Where the first communication device receives an indication from the first operator that an interpretation is incorrect, the first communication device or the connection server may store training data indicative of the idiosyncrasies of the manner in which the first operator makes particular sign language gestures. At a later time, that training data may be used in interpreting the sign language gestures of the first operator (e.g., to reduce errors, improve the speed of interpretation, etc.).

The first communication device may transmit profile data to the connection server indicating that the first operator communicates in sign language. Alternatively or additionally, the first communication device may transmit profile data to the connection server indicating that the first communication device includes at least a camera to capture sign language gestures and/or a display to present an avatar making sign language gestures. The connection server may employ such indications in profile data to trigger and/or enable conversions between sign language and text, and/or between sign language and speech as part of enabling the first operator to more easily converse with another operator who does not use sign language. By way of example, such an indication may trigger the connection server to perform such conversions itself, and/or to support the performance of such conversions by the first communication device by providing training data associated with the first operator to the first communication device. Alternatively or additionally, where the first operator is seeking to contact someone within an organization, the connection server may employ such indications in profile data to select a an operator of another communication device within an organization who is indicated as able to engage in sign language, and/or to select another operator of another communication device within the organization that is able to support conversions to and from sign language.

FIG. 1 illustrates a block diagram of an example communication system 1000 according to some implementations described herein. As depicted, the communication system 1000 may incorporate multiple communication devices 100 and one or more connection servers 300 to coordinate and enable communications among the communication devices 100. Various factors may determine whether the communication system 1000 incorporates one or more than one of the connection servers 300, such as the geographic area covered by the communication system 1000, design for fault tolerance and/or the quantity of communication devices 100 supported. As also depicted, these devices 100 and 300 may be coupled to and may engage in such communications via a network 999. However, one or more of these devices 100 and/or 300 may also exchange data entirely unrelated to such communications with each other and/or with still other devices (not shown) via the network 999.

In various implementations, the network 999 may be a single network that may extend within a single building or other relatively limited area, a combination of connected networks that may extend a considerable distance (e.g., throughout a campus, across a municipality, etc.), and/or may include the Internet. The network 999 may be based on any of a variety (or combination) of communications technologies by which communications may be effected, including without limitation, wired technologies employing electrically and/or optically conductive cabling, and/or wireless technologies employing infrared, radio frequency or other forms of wireless signal transmission.

Communications between two or more of the communication devices 100 may be routed through at least one of the one or more of the connection servers 300. More specifically, one of the communication devices 100 may be operated to transmit a request to one of the one or more connection servers 300 to engage in communications with another of the communication devices 100. Upon at least one of the one or more connection servers 300 determining to grant the request, at least one of the one or more connection servers 300 may route communications between those communication devices 100. Such communications may entail the exchange of text, speech, still images, video, etc., or a combination thereof. However, such communications may also entail conversions to and/or from sign language to accommodate one or more operators of a communication device 100 who communicates using sign language. Such conversions may occur within one or more communication devices 100 involved that are in communication with each other, and/or may occur within at least one of the one or more of the connection servers 300.

Figure 2A:
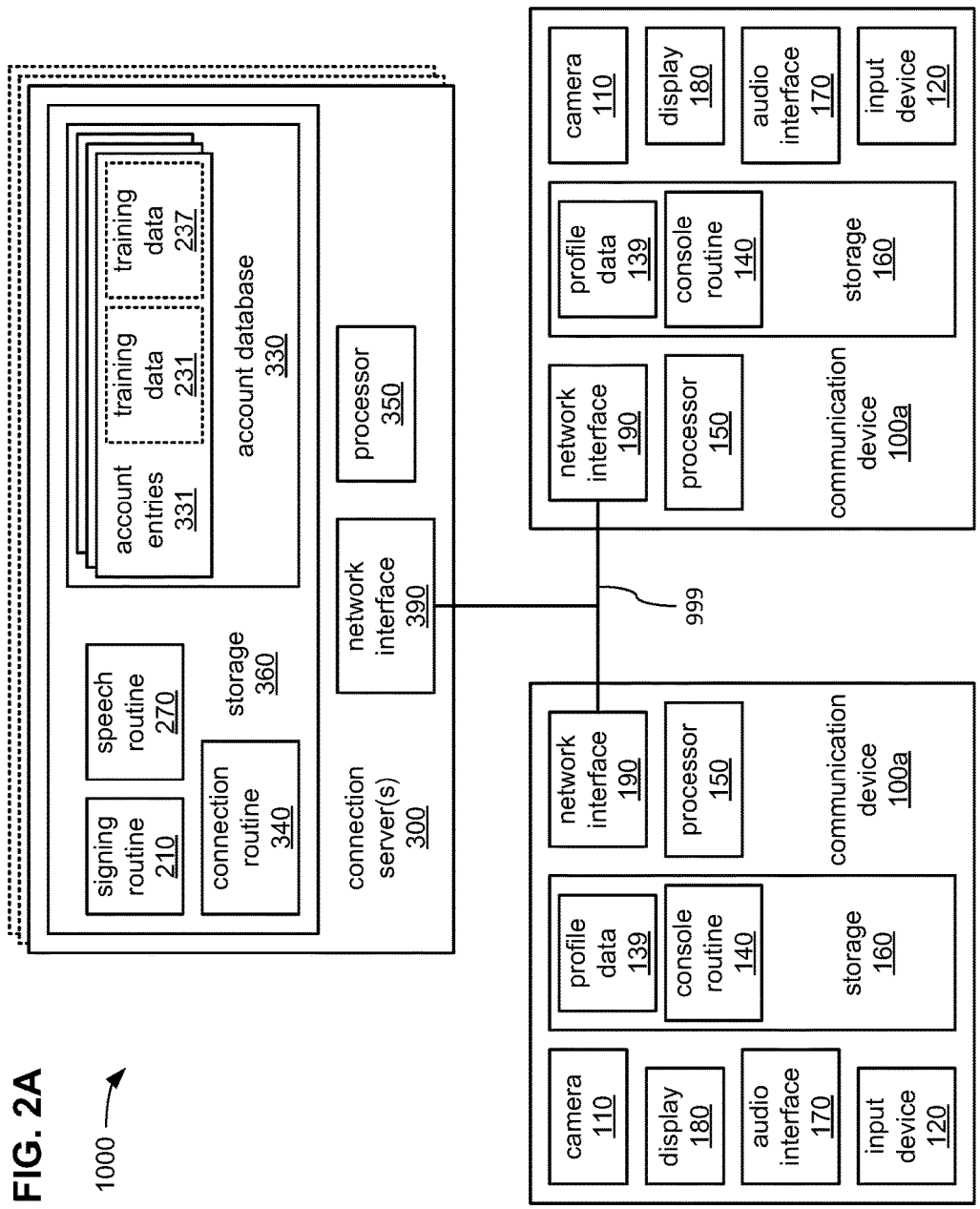
FIGS. 2A and 2B each illustrate an example implementation of communications between communication devices in a communication system according to at least some embodiments.

FIG. 2A illustrates a block diagram of an example of two of the communication devices 100, specifically communication devices 100a and 100b, communicating with each other. Further, it may be that the operator of the communication device 100a uses sign language, and the operator of the communication device 100b does not. To enable such communication, at least one of the one or more connection servers 300 performs conversions between sign language and text, and/or between sign language and speech.

As depicted, each communication device 100, including the communication devices 100a and 100b, may incorporate one or more of a processor 150, a storage 160 and a network interface 190 to couple the communication device 100 to the network 999. Also, each communication device 100, including the communication devices 100a and 100b, may incorporate and/or be coupled to one or more of a camera 110, an input device 120, an audio interface 170 and a display 180. The audio interface 170 may include and/or may enable coupling to one or more acoustic transducers (e.g., one or more microphones, one or more speakers, etc.) to capture and/or acoustically output sounds that may include speech. The storage 160 may store one or more of a console routine 140 and profile data 139. The console routine 140 may incorporate instructions operative on the processor 150 to implement logic to perform various functions as disclosed herein.

Turning to the communication device 100a, in executing the console routine 140, the processor 150 may operate the camera 110 to capture images of the operator of the communication device 100a making sign language gestures. The processor 150 may then be caused to operate the network interface 190 to transmit those captured images to one of the connection servers 300 for interpretation as part of converting those sign language gestures to text and/or to speech directed to the operator of the communication device 100b. Again, the captured images may include captured motion video of the operator of the communication device 100a making the sign language gestures. Also in executing the console routine 140, the processor 150 may further operate the network interface 190 to receive images from the connection server 300 of an avatar making sign language gestures generated from the conversion of text and/or speech originating from the communication device 100b. The processor 150 may then be caused to operate the display 180 to visually present the avatar making the sign language gestures to the operator of the communication device 100a. Alternatively or additionally, the processor 150 may be caused to operate the network interface 190 to receive the text from which the images of the avatar making the sign language gestures based on that text may be generated, and may present the text on the display 180. Again, the images of the avatar making sign language gestures may include motion video animation of the avatar making the sign language gestures.

Also, the processor 150 of the communication device 100a may monitor the input device 120 (e.g., a keyboard, a pointing device, a touch sensor overlying the display 180, etc.) for other input provided by the operator of the communication device 100a to control aspects of the communications with the operator of the communication device 100b. Further, as part of initiating and/or otherwise enabling such communications, the processor 150 may transmit the profile data 139 to the connection server 300. The profile data 139 may include indications that the operator of the communication device 100a uses sign language, and/or that the communication device 100a incorporates and/or is coupled to the camera 110 and the display 180 to support use of sign language by the operator of the communication device 100a.

Turning to the communication device 100b, in executing the console routine 140, the processor 150 may monitor the input device 120 (e.g., a keyboard, a pointing device, a touch sensor overlying the display 180, etc.) for text input from the operator of the communication device 100b. The processor 150 may then be caused to operate the network interface 190 to transmit such text to the connection server 300 for conversion into the images of the avatar making sign language gestures as has been described. Also in executing the console routine 140, the processor 150 may further operate the network interface 190 to receive the text generated from the captured images of the operator of the communication device 100a making sign language gestures. The processor 150 may then be caused to operate the display 180 to visually present that received text to the operator of the communication device 100b.

Alternatively or additionally, the processor 150 of the communication device 100b may operate one or more microphones incorporated into and/or coupled to the audio interface 170 to capture speech sounds uttered by the operator of the communication device 100b. The processor 150 may then be caused to operate the network interface 190 to transmit those captured speech sounds to the connection server 300 for conversion into the images of the avatar making sign language gestures as has been described. Also in executing the console routine 140, the processor 150 may further operate the network interface 590 to receive speech sounds generated from the captured images of the operator the communication device 100a making sign language gestures. The processor 150 may then be caused to operate one or more speakers incorporated into and/or coupled to the audio interface 170 to output those speech sounds to the operator of the communication device 100*b*. Further, as part of initiating and/or otherwise enabling such communications, the processor 150 may transmit the profile data 139 to the connection server 300. The profile data 139 may include indications that the operator of the communication device 100*b* is capable of hearing and/or does not use sign language, and/or indications that the communication device 100*b* incorporates the audio interface 170.

As depicted, each connection server 300 may incorporate one or more of a processor 350, a storage 360 and a network interface 390 to couple the connection server 300 to the network 999. Despite the depiction and discussion of a single network interface 390 for each of the connection servers 300, implementations are possible in which there is more than one of the network interfaces 390 (e.g., to increase throughput and/or fault tolerance in communications). The storage 360 may store one or more of a signing routine 210, a speech routine 270, a connection routine 340 and an account database 330. Each of these routines 210, 270 and 340 may incorporate instructions operative on the processor 350 to implement logic to perform various functions.

In executing the connection routine 340, the processor 350 may operate the network interface 390 to receive requests from ones of the communication devices 100 to communicate with others of the communication devices 100 via the network 999. Such requests may include information identifying the communication devices 100 making such requests, and/or the operators thereof. The processor 350 may compare such information to corresponding information included within one or more account entries 331 making up the account database 330. Each account entry 331 may include various details associated with one of the communication devices 100, and/or associated with an operator thereof. Such information within one or more of the account entries 331 may be employed by the processor 350 to determine whether to grant each request for communications and/or to contact the communication device(s) 100 with which each requesting communication device 100 requests communications.

Where one operator uses sign language (as in the case of the communication device 100*a*) and the other operator does not (as in the case of the communication device 100*b*), the processor 350 may additionally execute the signing routine 210 and/or the speech routine 270 to perform conversions between sign language and text and/or between sign language and speech. Such performance of conversion(s) may be triggered by indications in the profile data 139 received from one or more of the communication devices 100 of their capabilities and/or of whether their operator(s) use sign language.

Thus, in executing the signing routine 210, the processor 350 may operate the network interface 390 to receive, from the communication device 100*a*, the images captured by the camera 110 of the operator thereof making sign language gestures. The processor 350 may then be caused to convert those sign language gestures into text, and may then operate the network interface 390 to transmit that generated text to the communication device 100*b* for presentation to the operator thereof. Also in executing the signing routine 210, the processor 350 may operate the network interface 390 to receive text from the communication device 100*b* that was entered by the operator thereof and is directed to the operator of the communication device 100*a*. The processor 350 may then be caused to convert that received text into the images of an avatar making sign language gestures based on that text, and may then operate the network interface 390 to transmit those images of the avatar to the communication device 100*a* for presentation to the operator thereof. In this way, support is provided for the operator of the communication device 100*a* to use sign language to communicate with the operator of the communication device 100*b*, who may not be capable of communicating in sign language.

Where the connection server 300 is to additionally convert between text and speech in some implementations, the processor 350 may additionally execute the speech routine 270. In so doing, the processor 350 may convert the text generated from the captured images of the operator of the communication device 100*a* making sign language gestures into speech, and may then operate the network interface 390 to transmit that speech to the communication device 100*b* for presentation to the operator thereof. Also in executing the speech routine 270, the processor 350 may operate the network interface 390 to receive, from the communication device 100*b*, captured speech of the operator thereof. The processor 350 may then convert that captured speech into the text from which the images of the avatar making sign language gestures is to be generated. In this way, through execution of the signing routine 210 and the speech routine 270, the operator of the communication device 100*a* is able to use sign language, while the operator of the communication device 100*b* is able to use speech.

Where such conversions between sign language and text, and/or between sign language and speech are performed by the processor 350 of at least one of the connection servers 300, one or more of the account entries 331 may include training data 231 for use in interpreting captured sign language gestures or training data 237 for use in interpreting captured speech. In some implementations, execution of the signing routine 210 by the processor 350 may cause the processor 350 to operate in a training mode in which the processor 350 stores indications of idiosyncrasies in how an operator of one of the communication devices 100 (e.g., the operator of the communication device 100*a*) makes particular sign language gestures as the training data 231 within an account entry 331. Correspondingly, in some implementations, execution of the speech routine 270 by the processor 350 may cause by the processor 350 to operate in a training mode in which the processor 350 stores indications of idiosyncrasies in how an operator of one of the communication devices 100 (e.g., the operator of the communication device 100*b*) speaks particular words as the training data 237 within an account entry 331.

Figure 2B:
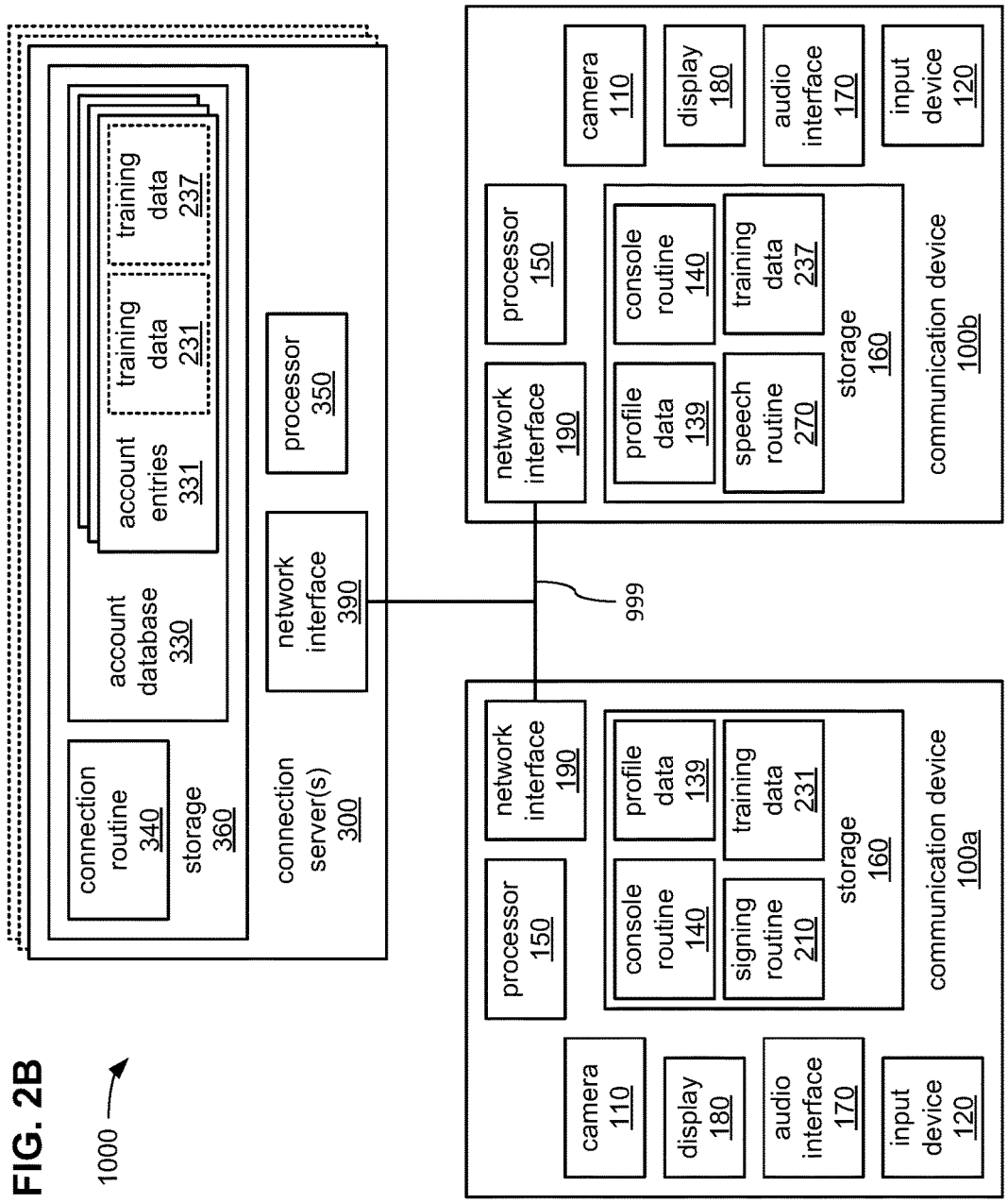

FIG. 2B illustrates a block diagram of another example of two of the communication devices 100, again communication devices 100*a* and 100*b*, communicating with each other. Again, the operator of the communication device 100*a* uses sign language, and the operator of the communication device 100*b* does not. Thus, this example of the communication devices 100*a* and 100*b* communicating in FIG. 2B is similar in many ways to the example of the communication devices 100*a* and 100*b* communicating in FIG. 2A. However, this example of FIG. 2B differs from the example of FIG. 2A in that the performance of the conversion between sign language and text and/or between sign language and speech is distributed among the communication devices 100*a* and 100*b*, instead of being performed by at least one of the one or more connection servers 300. As a result, following action by at least one of the connection servers 300 to cause routing of communications between the communication devices 100*a* and 100*b*, such communications may be conducted therebetween in a peer-to-peer manner with little or no additional involvement by the one or more connection servers 300.

Thus, in FIG. 2B, it may be the processor 150 of the communication device 100a that executes the signing routine 210, and therefore, performs conversions between sign language and text, instead of the processor 350 of at least one of the connection servers 300. As a result, the storage 160 of the communication device 100a may additionally store the signing routine 210 along with an instance of the training data 231. Alternatively or additionally, it may be the processor 150 of the communication device 100b that executes the speech routine 270, and therefore, performs conversions between text and speech, instead of the processor 350 of at least one of the connection servers 300. As a result, the storage 160 of the communication device 100b may additionally store the speech routine 270 along with an instance of the training data 237.

It should be noted that although example implementations have been depicted in which both of the signing routine 210 and the speech routine 270 are centrally executed within one or more of the connection servers 300, or in which execution of both of the signing routine 210 and the speech routine 270 is distributed among one or more of the communication devices 100, other implementations are possible in which either of these routines 210 or 270 may be executed within one or more of the communication devices 100 while the other is executed within the one or more connection servers 300. Also, regardless of where these routine 210 and/or 270 are executed within the communication system 1000, each of the routines 140, 210, 270 and 340, including the components of which each is composed, may be selected to be operative on whatever type of processor or processors that are selected to implement applicable ones of the processors 150 and/or 350.

In various implementations, each of these routines 140, 210, 270 and 340 may include one or more of an operating system, device drivers and/or application-level routines (e.g., "software suites" provided on disc media, "applets" or "applications" obtained from a remote server, etc.). Where an operating system is included, the operating system may be any of a variety of available operating systems appropriate for whatever corresponding ones of the processors 150 or 350. Where one or more device drivers are included, those device drivers may provide support for any of a variety of other components, whether hardware or software components, of corresponding ones of the devices 100 or 300.

Figure 3A:
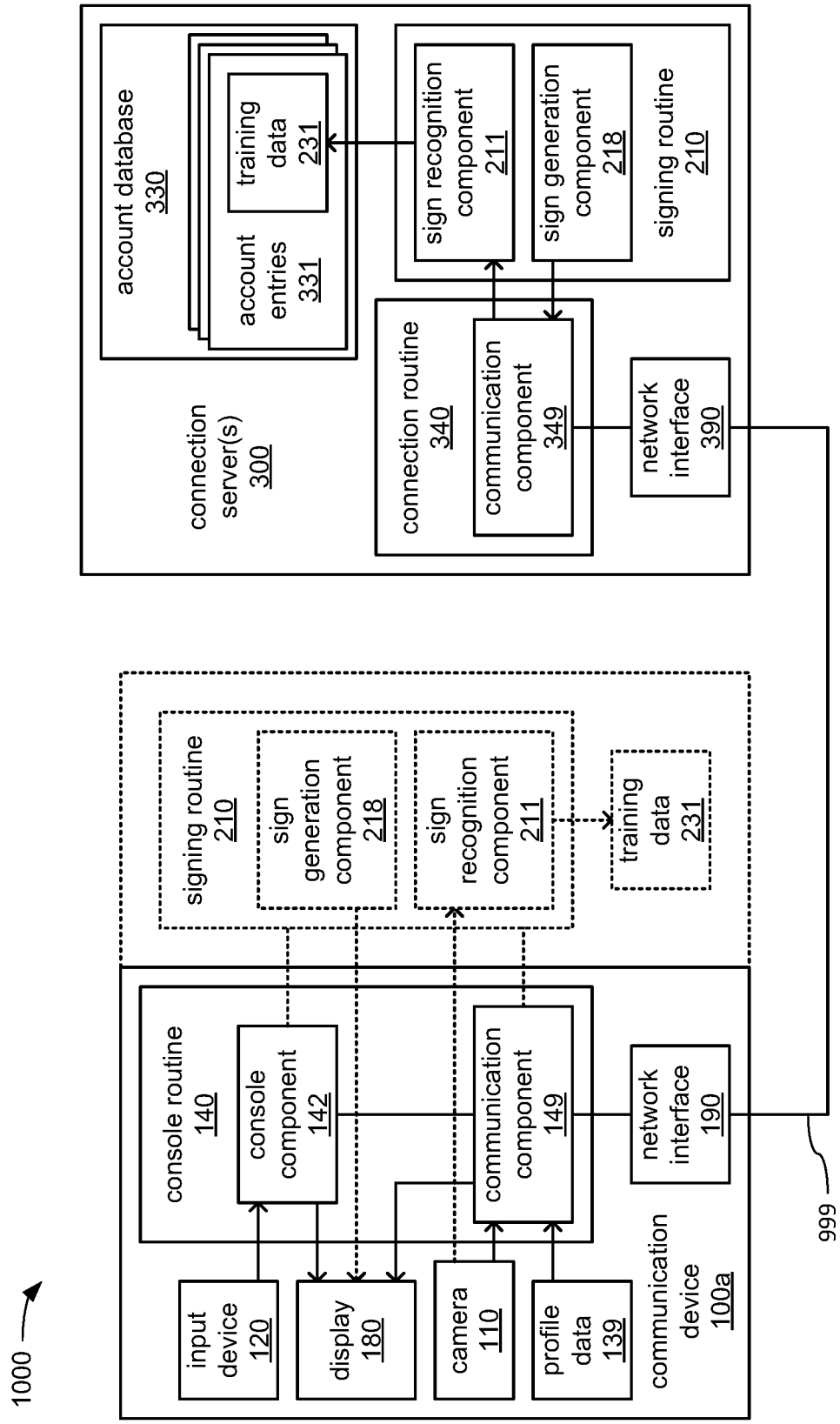
FIGS. 3A and 3B, together, illustrate an example implementation of preparations for communications in a communication system according to at least some embodiments.
Figure 3B:
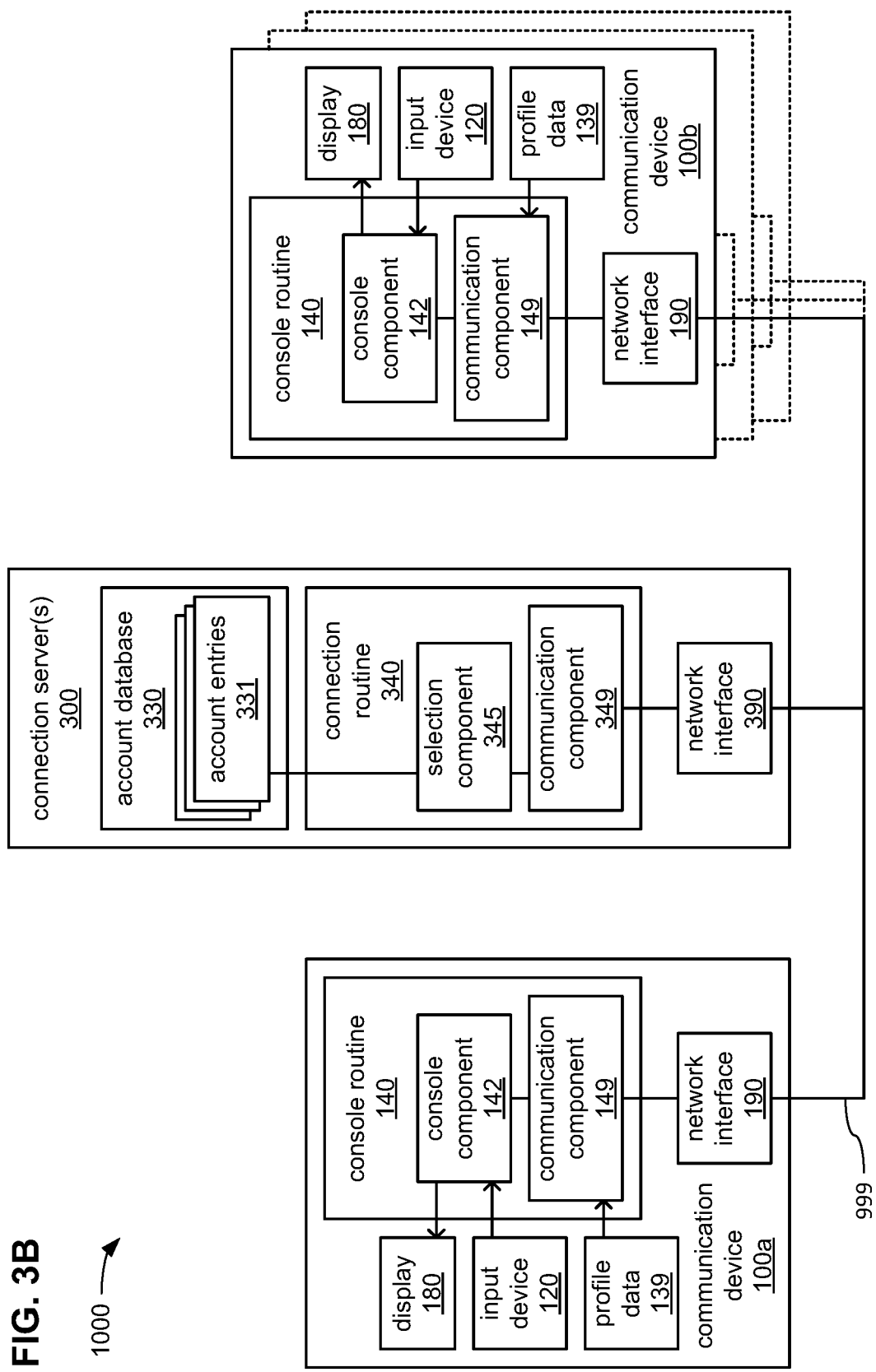

FIGS. 3A and 3B, together, illustrate example implementation of preparations for communications through the communication system 1000. More specifically, FIG. 3A depicts aspects of operating in a training mode in preparation to improve interpretation of sign language gestures, and FIG. 3B depicts aspects of initiating communications among at least two the communication devices 100a and 100b.

Referring to both of FIGS. 3A and 3B, the console routine 140 may include a communication component 149 executable by the processor 150 to operate the network interface 190 to exchange communications via the network 999 as previously described. Correspondingly, the connection routine 340 may include a communication component 349 executable by the processor 350 to operate the network interface 390 to also exchange communications via the network 999 as previously described. Again, among such communications may be those conveying captured images of an operator making sign language gestures (e.g., captured motion video of the operator making sign language gestures), images of at least one avatar making sign language gestures (e.g., motion video animation of at least one avatar making sign language gestures), text, captured speech of an operator, and/or speech generated from text to be acoustically output to an operator. Each of the communication components 149 and/or 349 may be selected to be operable with whatever type of network interface technology is selected to implement the network interfaces 190 and/or 390, respectively.

Turning more specifically to FIG. 3A, the console routine 140 may include a console component 142 for execution by the processor 150 of the communication device 100a to operate the input device 120 and/or the display 180 to provide a user interface to an operator of the communication device 100a. As previously discussed, such provision of a user interface may enable an operator to enter an identifier of an operator of another of the communication devices 100 (e.g., the communication device 100b) to request communications with.

As also depicted in FIG. 3A, the signing routine 210, whether executed within the communication device 100a or executed within the connection server 300, may include a sign recognition component 211 to convert captured images of the operator of the communication device 100a making sign language gestures into text. The signing routine 210 may also include a sign generation component 218 to convert text entered by the operator of the communication device 100b into images of an avatar making sign language gestures based on the entered text. The avatar generated by the sign generation component 218 may be generated to resemble any of a variety of persons, animated characters, animals, fictional creatures, etc. having hands and/or facial features with the characteristics required to form sign language gestures. The images of the avatar making the sign language gestures may be motion video animation generated from a library of sequences of poses of an animated character that, when presented in sequence at a predetermined frame rate, provide animated movement of the animated character avatar forming sign language gestures with hands (or whatever the equivalent that a particular animated character avatar may have, especially if the avatar is supposed to be some fictional type of creature or an animated representation of an animal) and/or facial expressions.

Prior to such communications use, the components 211 and/or 218 may be executed by the processor 150 or 350 to perform a training operation to improve the ability of the sign recognition component 211 to interpret the sign language gestures made by the operator of the communication device 100a. More specifically, where the signing routine 210 is executed within the communication device 100a to perform such a training operation (as depicted with dotted lines in FIG. 2A), the sign recognition component 211 may operate the camera 110 to capture images of the operator of the communication device 100a making sign language gestures of their choosing. Alternatively, the sign recognition component 211 may cooperate with the console component 142 of the console routine 140 to operate the display 180 to visually guide the operator of the communication device 100a through making particular sign language gestures. The sign recognition component 211 may then operate the camera 110 to capture images of the operator of the communication device 100a making those particular sign language gestures.

Regardless of what sign language gestures the operator of the communication device 100a makes, the sign recognition component 211 may interpret those sign language gestures within those captured images, and may provide an indication via the display 180 of what those interpretations are. In some implementations, the sign recognition component 211 may cooperate with the sign generation component 218 to present an avatar on the display 180 that makes sign language gestures indicating what those interpretations are. This may be deemed useful in such circumstances as when the operator of the communication device 100a may be learning to how to properly make sign language gestures such that being visually presented with what those interpretations are using the avatar may be helpfully instructive to the operator. Alternatively or additionally, the sign recognition component 241 may cooperate with the console component 142 to present text on the display 180 that indicates what those interpretations are.

Regardless of the manner in which the operator of the communication device 100a is presented with indications of what the interpretations are, the sign recognition component 211 may cooperate with the console component 142 to monitor the input device 120 for indications from the operator of which interpretations are correct and/or which are not. In response to indications of incorrect interpretations, the sign recognition component 211 may store indications of the idiosyncrasies of the manner in which the operator makes sign language gestures within the training data 231. Such indications may be of differences between the manner in which the operator of the communication device 100a makes sign language gestures and a manner in which those sign language gestures are expected to be made (e.g., a manner that follows an accepted standard). In some implementations, the training data 231 may be divided into multiple portions thereof that are each associated with a different operator of the communication device 100a where there is more than one operator of the communication device 100a who uses sign language. At a later time when the communication device 100a is operated by an operator who uses sign language in communications with an operator of another of the communication devices 100 who does not, the sign recognition component 211 may be caused to retrieve the portion of the training data 231 associated with that particular operator of the communication device 100a. In some implementations, the sign recognition component 211 may cooperate with the communication component 149 to transmit a copy of the training data 231 to the connection server 300 for storage within an account entry 331 of the account database 330 that is associated with that particular operator.

Alternatively, where the signing routine 210 is executed within the connection servers 300, the sign recognition component 211 may cooperate with the communication component 349 of the connection routine 340 to receive captured images of the operator of the communication device 100a making sign language gestures of their choosing, as relayed to the connection server 300 from the communication device 100a. Alternatively, the sign recognition component 211 may cooperate with the communication component 349 to further cooperate with the console component 142 through the network 999 to operate the display 180 to guide the operator of the communication device 100a through making one or more particular sign language gestures. The sign recognition component 211 may then await receipt through the network 999 of images of the operator of the communication device 100a making those sign language gestures as captured by the camera 110. Regardless of what sign language gestures the operator of the communication device 100a makes, the sign recognition component 211 may interpret those sign language gestures within those captured images, and may cooperate with the communication component 349 to transmit indications of what those interpretations are via the network to the communication device 100a for presentation. In some implementations, the sign recognition component 211 may cooperate with the sign generation component 218 to provide that indication to the communication device 100a as images of an avatar making sign language gestures for presentation by the console component 142 on the display 180. Alternatively or additionally, the sign recognition component 211 may cooperate with the console component 142 through the network 999 to present text on the display 180 that indicates what those interpretations are.

Regardless of the manner in which the operator of the communication device 100a is presented with indications of what the interpretations are, the sign recognition component 211 may further cooperate with the console component 142 through the network 999 to monitor the input device 120 for indications from the operator of which interpretations are correct and/or which are not. In response to indications of incorrect interpretations, the sign recognition component 211 may store indications of the idiosyncrasies of the manner in which the operator makes sign language gestures within the training data 231, which may be stored as part of an account entry 331 associated with the operator within the account database 330. In some implementations, the sign recognition component 241 may cooperate with the communication component 349 to transmit a copy of the training data 231 to the communication device 100a to be stored within the storage 160 thereof.

Turning more specifically to FIG. 3B, in a manner corresponding to the console routine 140 of the communication device 100a, the console routine 140 of the communication device 100b may include a console component 142 for execution by the processor 150 thereof to operate the input device 120 and/or the display 180 to provide a user interface to an operator of the communication device 100b. Such provision of a user interface may enable the operator of the communication device 100b to enter an identifier of an operator of another of the communication devices 100 (e.g., the communication device 100a) to request communications with. Thus, the operator of either of the communication devices 100a or 100b may employ the user interface provided by their respective instances of the console component 142 to trigger the transmission of a request to one of the one or more connection servers 300 for communications with the other through the communication system 1000.

Alternatively, it may be that the operator of the communication device 100a, who uses sign language, seeks to communicate with someone within an organization that has multiple operators of multiple communication devices 100, where it may be that none of the multiple operators use sign language. This may be the case, by way of example, where the operator of the communication device 100a is a customer or potential customer of the organization to which the multiple operators belong, and the operator of the communication device 100a wishes to discuss an aspect of a product or service provided by that organization with someone associated with that organization. As depicted in FIG. 3B, the connection routine 340 may include a selection component 345 for execution by the processor 350 to receive such a request from the communication device 100a. In response, the selection component 345 may select one of the multiple communication devices 100 associated with one of the multiple operators to be put into communication with the operator of the communication device 100a. It may be that, at an earlier time, each of the multiple communication devices 100 associated with that organization provided an instance of the profile data 139 to the connection server 300.

Each such instance of the profile data 139 may include an indication of whether the operator of each of the multiple communication devices 100 is able to use sign language such that they are able to communicate in sign language with the operator of the communication device 100a via two-video communications. The selection component 345 may store indications of such information for each of the multiple operators and/or for each one of the multiple communication devices 100 within a separate account entry 331 of the account database 330.

Thus, upon receipt of the request from the communication device 100a for communications with one of the multiple communication devices 100 associated with one of multiple operators, the selection component 345 may first search for an available one of the multiple operators who is able to use sign language. If there is such an operator of the multiple operators who is currently available such that their associated one of the multiple communication devices 100 is available to engage in communications, and if their associated one of the multiple communication devices 100 is indicated to be capable of two-way video communications, then the selection component 345 may select that particular communication device 100 (and therefore, that particular operator) for two-way video communications with the communication device 100a. However, if there is no such operator available among the multiple operators or no such communication device 100 available among the multiple communication devices 100, then the selection component 345 may select one of the multiple communication devices 100 that is available for communications with the communication device 100a in which conversion to and from sign language will be performed (specifically, the communication device 100b, as depicted).

Figure 4A:
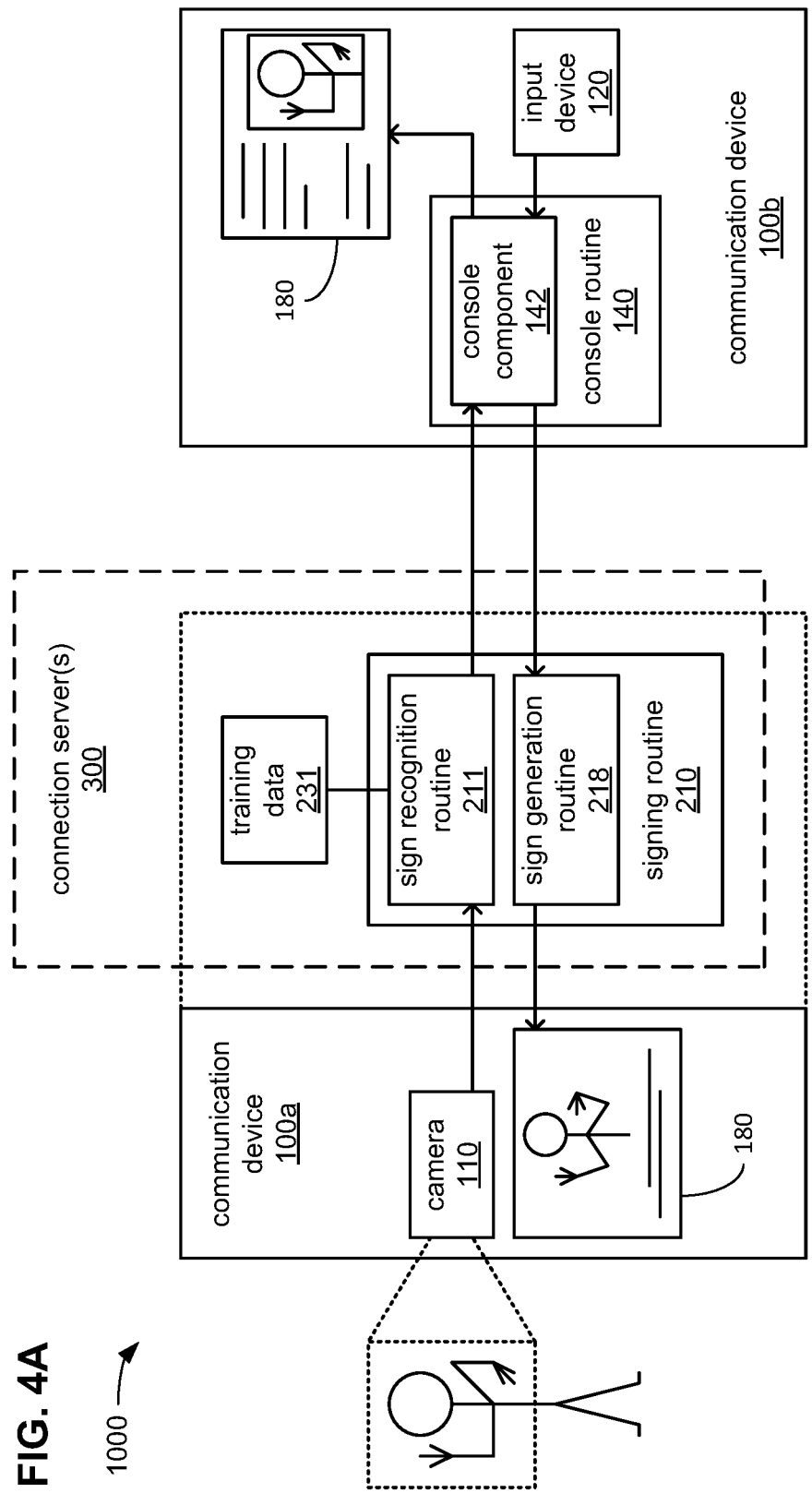
FIGS. 4A and 4B each illustrate an example implementation of conversions to and from sign language in a communication system according to at least some embodiments.
Figure 4B:
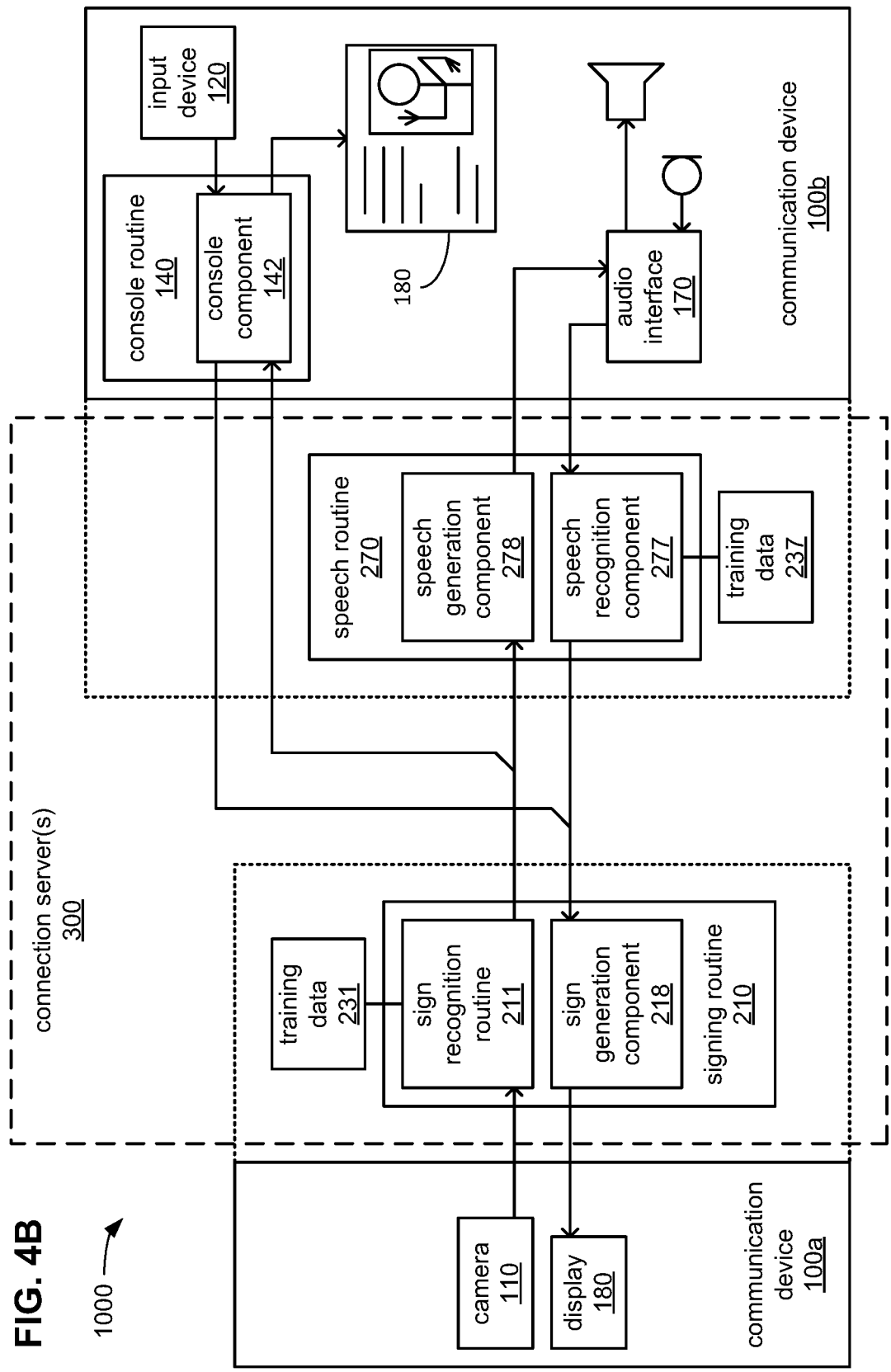

FIGS. 4A and 4B each illustrate an example implementation of communications through the communication system 1000. More specifically, FIG. 4A depicts aspects of communications in which conversion between sign language and text is employed, and FIG. 4B depicts aspects of communications in which conversion between sign language and each of text and speech is employed.

Referring to both of FIGS. 4A and 4B, as earlier discussed and as depicted with dotted lines, the signing routine 210 may be executed within the communication device 100a, and/or the speech routine 270 may be executed within the communication device 100b. However, as also discussed and as depicted with dashed lines, either or both of the signing routine 210 and the speech routine 270 may be executed within the connection server 300.

Turning more specifically to FIG. 4A, during communications in which conversion between sign language and text is employed, the sign recognition component 211 of the signing routine 240 may interpret images captured by the camera 110 (e.g., captured motion video) of the operator of the communication device 100a making sign language gestures to generate text therefrom. In so doing, and as previously discussed, the sign recognition component 211 may refer to the training data 231 to better accommodate idiosyncrasies in the manner in which the operator makes one or more particular sign language gestures so as to improve interpretation accuracy. Such generated text may then be relayed to the console component 142 of the console routine 140 executed within the communication device 100b to be visually presented on the display 180 to operator thereof to read. Additionally, along with such text, the captured images of the operator of the communication device 100a making sign language gestures may also be relayed to the console component 142 in the communication device 100b for visual presentation on the display 180 alongside the text. This may be deemed desirable to enable the operator of the communication device 100b to see the facial expressions of the operator of the communication device 100a, which may aid in providing some degree of emotional context to what the operator of the communication device 100a is communicating with sign language.

Correspondingly, the console component 142 of the console routine 140 executed within the communication device 100b may monitor the input device 120 for entry of text input by the operator thereof to relay to the sign generation component 218 of the signing routine 210. The sign generation component 218 may convert such relayed text into the images (e.g., motion video animation) of the avatar making sign language gestures on the display 180 of the communication device 100a. In some implementations, at least a portion of an image of the face of the operator of the communication device 100b may be provided to the sign generation component 218 to enable the avatar to be given a face at least resembling that of the operator of the communication device 100b. In some implementations, the same text from which the images of the avatar making sign language gestures are generated may be visually presented on the display 180 of the communication device 100a along with the images of the avatar. This may be deemed desirable where there may be one or more particular sign language gestures made by the avatar that are not known to the operator of the communication device 100a.

In implementations in which the signing routine 210 is executed within the communication device 100a, the sign recognition component 211 may operate the camera 110 to capture images of the operator of the communication device 100a making sign language gestures. Also, the sign generation component 218 may operate the display 180 of the communication device 100a to present the images of the avatar making sign language gestures. Also, these components of the signing routine 210 may cooperate with the communication component 149 of the console routine 140 (not shown for sake of visual clarity) to exchange the texts with the communication device 100b through the network 999. Correspondingly, the console component 142 of the console routine 140 executed within the communication device 100b may cooperate with the communication component 149 thereof (also not shown for sake of visual clarity) to exchange the texts with the communication device 100a through the network 999. In different implementations, such exchanges of the texts between the communication devices 100a and 100b may or may not be relayed through the connection server 300.

Alternatively, in implementations in which the signing routine 210 is executed within at least one of the connection servers 300, the sign recognition component 211 may cooperate with the communication component 349 of the connection routine 340 (not shown) to receive the images captured by the camera 110 of the operator of the communication device 100a making sign language gestures from the communication device 100a via the network 999. Also, the sign generation component 218 may cooperate with the communication component 349 to transmit the images it generates of the avatar making sign language gestures to the communication device 100a for visual presentation on the display 180 thereof. Further, these components of the signing routine 210 may cooperate with the communication component 349 to exchange the texts with the communication device 100b through the network 999. Correspondingly, the console component 142 of the console routine 140 executed within the communication device 100b may cooperate with the communication component 149 thereof (also not shown for sake of visual clarity) to exchange the texts with the communication device 100a through the network 999.

Turning more specifically to FIG. 4B, during communications in which conversion between sign language and speech is employed, the sign recognition component 211 of the signing routine 210 may interpret images captured by the camera 110 of the operator of the communication device 100a making sign language gestures to generate text therefrom. Such generated text may then be relayed to a speech generation component 278 of the speech routine 270 to be converted into synthesized speech sounds to be acoustically output by at least one speaker incorporated into and/or coupled to the audio interface 170 of the communication device 100b for the operator thereof to listen to. Additionally, such generated text may also be relayed to the console component 142 of the console routine 140 executed within the communication device 100b to be visually presented on the display 180 for the operator of the communication device 100b to read. Alternatively or additionally, along with such text, the captured images of the operator of the communication device 100a making the sign language gestures may also be relayed to the console component 142 of the communication device 100b for visual presentation alongside the text on the display 180 thereof.

Correspondingly, a speech recognition component 277 of the speech routine 270 may operate one or more microphones incorporated into and/or coupled to the audio interface 170 of the communication device 100b to capture speech uttered by the operator thereof, and may convert such speech into text. In so doing, and as previously discussed, the speech recognition component 277 may refer to the training data 237 to better accommodate idiosyncrasies in the manner in which the operator of the communication device 100b speaks to improve speech recognition accuracy. In some implementations, at least the speech recognition component 277 may have been operated in a training mode at an earlier time to generate the training data 237 in a manner akin to how the training data 231 has been described as being generated. The speech recognition component 277 may then relay the text generated from the captured speech to the sign generation component 218 of the signing routine 210. Additionally, the console component 142 of the console routine 140 executed within the communication device 100b may monitor the input device 120 for entry of text input by the operator thereof to also relay to the sign generation component 218 of the signing routine 210. The sign generation component 248 may convert text received from either of the speech recognition component 277 or the console component 142 of the communication device 100b into the images of the avatar making sign language gestures on the display 180 of the communication device 100a. In some implementations, the same text from which the images of the avatar making sign language gestures are generated may be visually presented on the display 180 of the communication device 100a along with the images of the avatar.

In implementations in which the speech routine 270 is executed within the communication device 100b, the speech recognition component 277 may operate the audio interface 170 of the communication device 100b to capture speech uttered by the operator thereof. Also, the speech generation component 278 may operate the audio interface 170 of the communication device 100b to acoustically output synthesized speech generated from the text generated from the sign language gestures of the operator of the communication device 100a. Also, these components of the speech routine 270 may cooperate with the communication component 149 of the console routine 140 (not shown for sake of visual clarity) to exchange the texts with the communication device 100a or with the connection server 300 through the network 999. Where such texts are exchanged with the communication device 100a, such exchanges of the texts may or may not be relayed through the connection server 300.

Alternatively, in implementations in which the speech routine 270 is executed within at least one of the connection servers 300, the speech recognition component 277 may cooperate with the communication component 349 of the connection routine 340 (not shown) to receive from the communication device 100b captured speech sounds uttered by the operator thereof via the network 999. Also, the speech generation component 278 may cooperate with the communication component 349 to transmit the synthesized speech generates from the text generated by the sign recognition component 241 to the communication device 100b for acoustic output through one or more speakers associated with the audio interface 170 thereof. Further, these components of the speech routine 270 may cooperate with the communication component 349 to exchange the texts with the communication device 100a through the network 999 where the signing routine 210 is not also executed within one of the connection servers 300.

Referring back to FIGS. 2A-B, 3A-B and 4A-B, each of the processors 150 and 350 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

Each of the storages 160 and 360 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

Each of the network interfaces 190 and 390 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
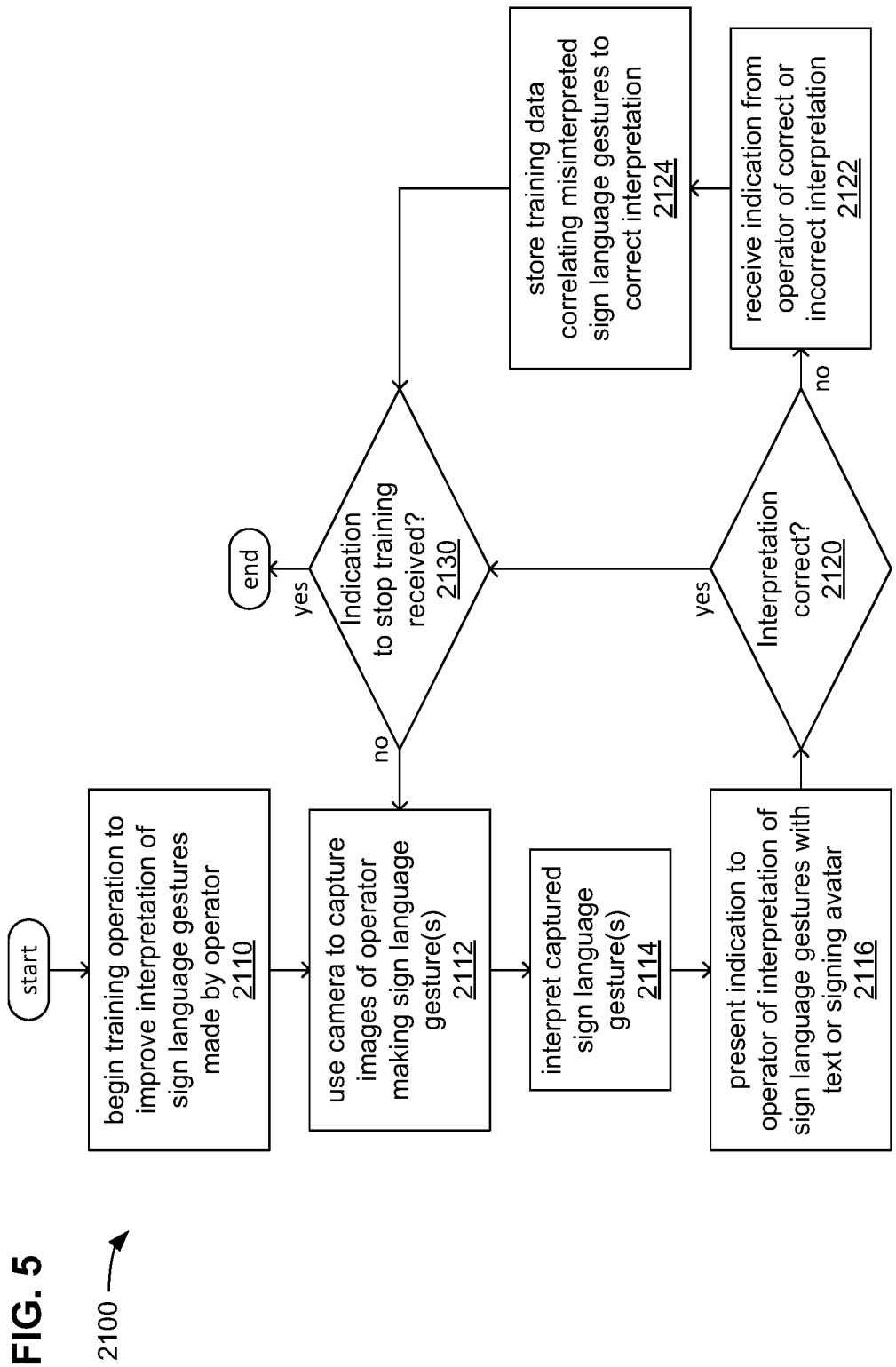
FIG. 5 illustrates a flow diagram of an example implementation of preparations for communications in a communication system according to at least some embodiments.

FIG. 5 illustrates a flow diagram of an example implementation of preparations for communications through a communication system. The logic flow 2100 may be representative of some or all of the operations executed by implementations of one or more devices described herein. More specifically, the logic flow 2100 may illustrate operations performed by the processors 150 and/or 350 in executing the console routine 140 and/or the signing routine 210, and/or performed by other components of a communication device 100 and/or a connection server 300.

At 2110, a processor of either a communication device or a connection server of a communication system (e.g., the processor 150 of one of the communication devices 100 or the processor 350 of a connection server 300 of the communication system 1000) may receive an indication of operation of the communication device (e.g., operation of an input device thereof) to begin a training operation to improve its interpretation of the sign language gestures made by the operator of the communication device. At 2112, a camera of the communication device (e.g., the camera 110) is used to capture images of the operator making one or more sign language gestures. Again, such captured imagery may include captured motion video (e.g., a sequence of images of the operator captured at a predetermined frame rate) of the operator making one or more sign language gestures.

At 2114, the processor may interpret the captured sign language gestures. As has been discussed, in different implementations, it may be the communication device or a connection server that interprets images captured of the operator making sign language gestures as part of converting those sign language gestures into text.

At 2116, a display of the communication device (e.g., the display 180) may present an indication of what the interpretation was to the operator. As has been discussed, such a presentation may be in the form of images of an avatar making sign language gestures to express the interpretation in sign language on the display and/or may be in the form of text expressing the interpretation on the display. Again, the avatar may be selected to resemble a person, an animated cartoon character, a real animal, a fictional creature, or any other form having sufficient attributes (e.g., hands and/or facial expressions) to generate sign language gestures. And again, such presented imagery may include motion video animation (e.g., a sequence of computer-generated images presented at a predetermined frame rate) of the avatar making sign language gestures.

At 2120, the processor may check for receipt of an indication that the interpretation is correct or incorrect. If the interpretation was correct, then at 2130, the processor may check for an indication of operation of the communication device (e.g., operation of an input device thereof) to end the training operation. If there is no such indication, then the camera of the communication device may again be used at 2112 to capture more images of the operator making sign language gestures.

However, if at 2120, the interpretation was incorrect, then at 2122 an input device of the communication device (e.g., the input device 120, such as a keyboard, pointing device, etc.) may be used by the processor to accept an indication entered by the operator of what the correct interpretation is. At 2124, the processor may store training data correlating the misinterpreted sign language gestures to their correct interpretation, before making the check as to whether end the training operation at 2130.

Figure 6:
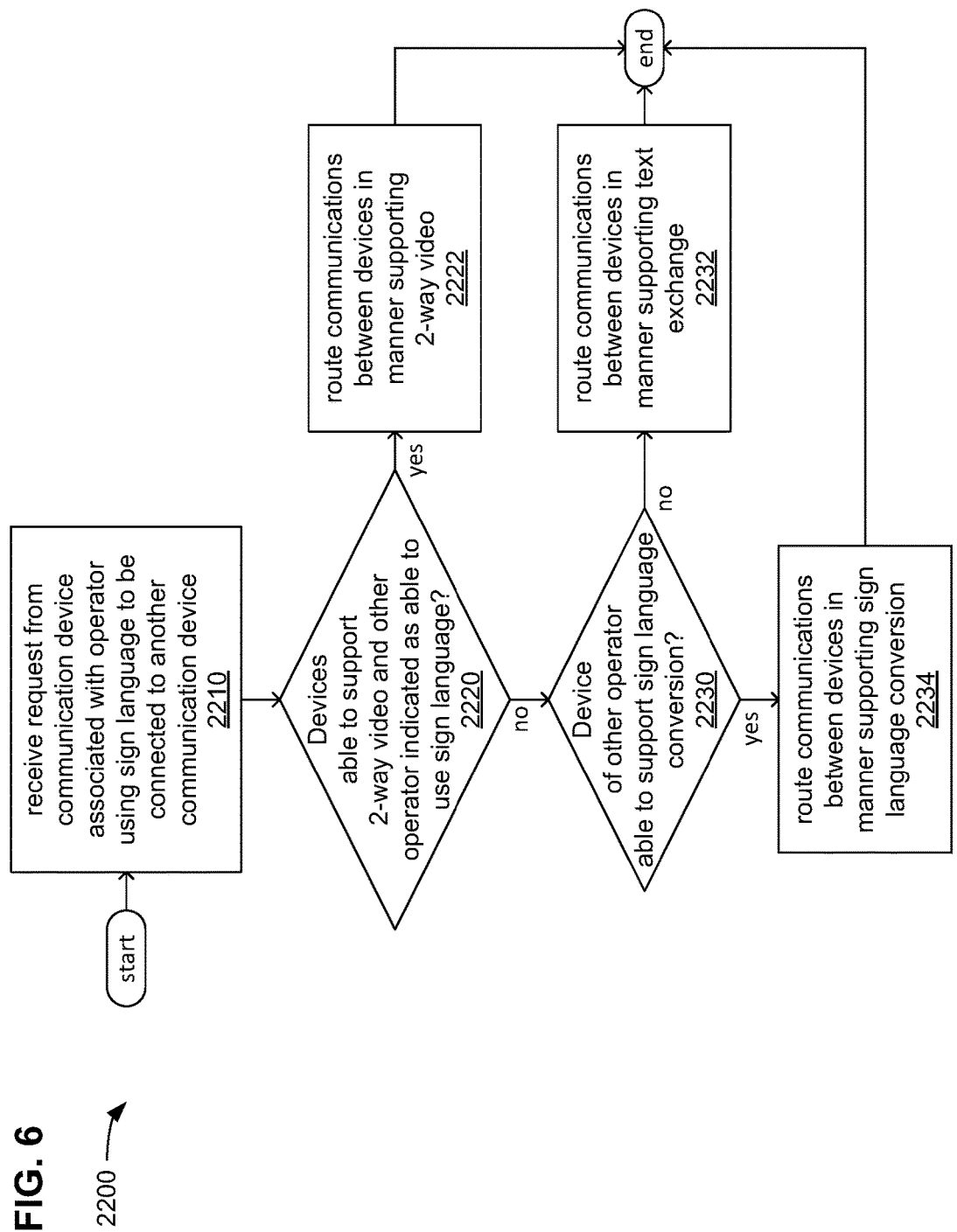
FIG. 6 illustrates a flow diagram of an example implementation of initiation of communications in a communication system according to at least some embodiments.

FIG. 6 illustrates a flow diagram of an example implementation of initiation of communications through a communication system. The logic flow 2200 may be representative of some or all of the operations executed by implementations of one or more devices described herein. More specifically, the logic flow 2200 may illustrate operations performed by the processor 350 in executing the connection routine 340, and/or performed by other components of a connection server 300.

At 2210, a processor of a connection server of a communication system (e.g., the processor 350 of a connection servers 300 of the communication system 1000) may receive, via a network, a request from a communication device associated with an operator using sign language (e.g., the communication device 100a) to communicate with one of multiple operators of one of multiple communication devices who may not use sign language. As has been discussed, such a request may be received where there are multiple operators associated with an organization that provides goods or services, and an operator who uses sign language may be a customer or potential customer of that organization who is seeking to communicate with someone within that organization.

At 2220, the processor may check whether there are any of the multiple communication devices associated with the multiple operators where the communication device is capable of supporting two-way video communications and the operator thereof is indicated as being able to communicate using sign language. By way of example, and as has been discussed, the processor may check account entries 331 for each such device within an account database for such indications, which may have been originally provided via profile data 139 earlier provided by each of the multiple communication devices. If there is such a communication device, then at 2222, the processor may route two-way video communications between the communication device requesting communications and the communication device of the multiple communication devices fitting the criteria checked for at 2220.

However, if no such communication device of the multiple communication devices is able to be found at 2220, the processor may perform a check at 2230 as to whether the communication device that is requesting communications is able to support the use of sign language by its operator. For example, and as has been discussed, a check may be made as to whether the communication device of the operator using sign language indicates (e.g., via the profile data 139) that it incorporates a display and camera (e.g., the display 180 and the camera 110) that can be operated to capture images of the operator making sign language gestures and to display sign language gestures back to the operator. If not, then at 2232, the processor may route text communications between the communication device requesting communications and an available communication device of the multiple communication devices.

However, if the communication device of the operator using sign language is so capable at 2230, then at 2234, the processor may route communications between the communication device of the operator using sign language and an available communication device of the multiple communication devices, where the communications include two-way conversion between sign language and text and/or between sign language and speech.

Figure 7:
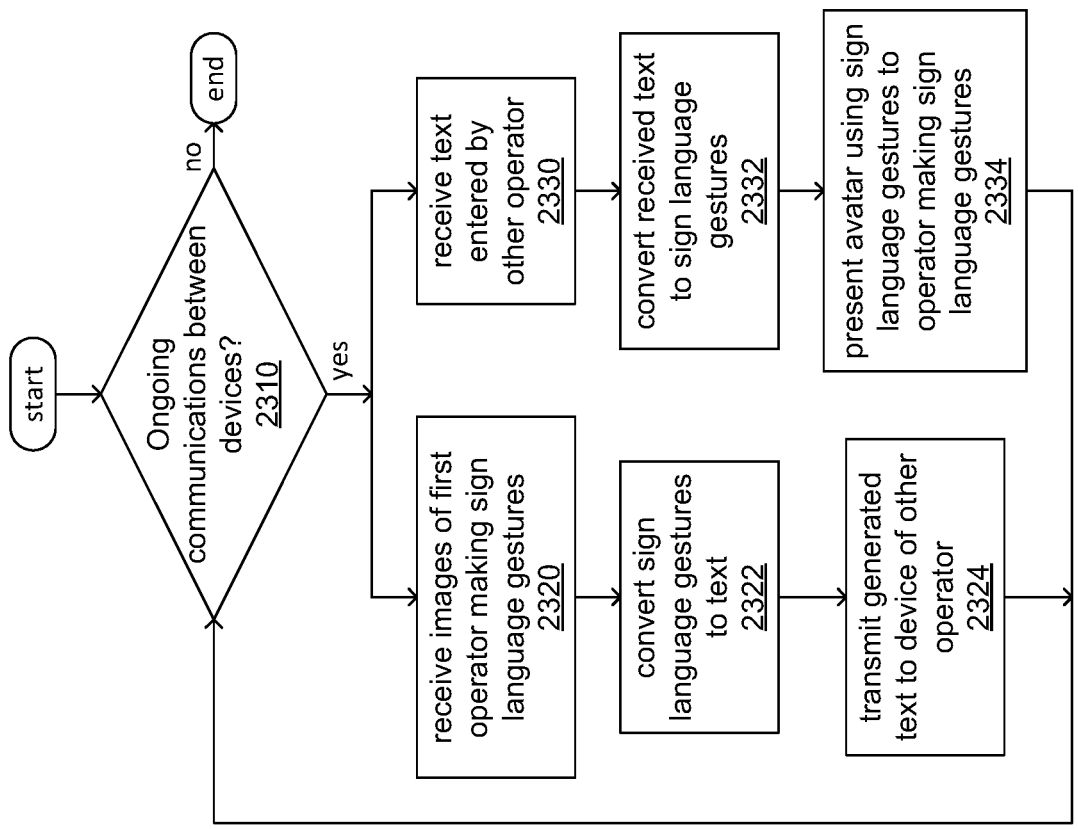
FIG. 7 illustrates a flow diagram of an example implementation of conversions to and from sign language in a communication system according to at least some embodiments.

FIG. 7 illustrates a flow diagram of an example implementation of conversions to and from sign language in a communication system. The logic flow 2300 may be representative of some or all of the operations executed by implementations of one or more devices described herein. More specifically, the logic flow 2300 may illustrate operations performed by the processors 150 and/or 350 in executing the console routine 140 and/or the signing routine 210, and/or performed by other components of a communication device 100 and/or a connection server 300.

At 2310, a processor of either a communication device or a connection server of a communication system (e.g., the processor 150 of a communication device 100 or the processor 350 of a connection server 300 of the communication system 1000) may check whether communications earlier routed between a communication device of an operator using sign language and another communication device of another operator that does not are still ongoing. If so at 2310, then the processor may perform both parts of a two-way conversion between sign language and at least text.

More precisely, and proceeding through one part of the two-way conversion, the processor may, at 2320, receive images captured of the operator who uses sign language making sign language gestures. As has been discussed, if the signing routine 210 is executed within a connection server 300 such that conversions to and from sign language are performed by the processor 350 thereof, then the captured images of the operator making sign language gestures may be received from the communication device of the operator who uses sign language via a network extending therebetween (e.g., a portion of the network 999).

At 2322, the processor may perform the conversion of the sign language gestures in the captured images into text. Again, in so doing, the processor may employ training data earlier generated during a training operation to improve the accuracy of the interpretation of those sign language gestures as part of performing the conversion.

At 2324, the processor may transmit the text generated by this conversion to the other communication device of the other operator who does not use sign language via the network. As previously discussed, if the conversion from sign language to text is performed within the communication device of the operator who uses sign language, then the text may be relayed through the connection server, as well as through the network.

Proceeding through the other part of the two-way conversion, and at least partly simultaneously with the performance of the operations at 2320 through 2324, the processor may also receive, from the other communication device of the other operator who does not use sign language and through the network, text entered by the other operator at 2330. At 2332, the processor may perform the conversion of the text entered by the other operator and directed to the operator who uses sign language into images of an avatar performing sign language gestures based on the entered text.

At 2334, the avatar making the generated sign language gestures is presented on a display of the communication device of the operator who uses sign language. As has been explained, if this conversion from text entered by the other operator who does not use sign language is performed within the communication device of the operator who does, then entered text may be relayed through the connection server, as well as through the network.

With the operations of both 2320 through 2324 and 2330 through 2334 performed, the processor may again check as to whether these communications are still ongoing at 2310.

Figure 8:
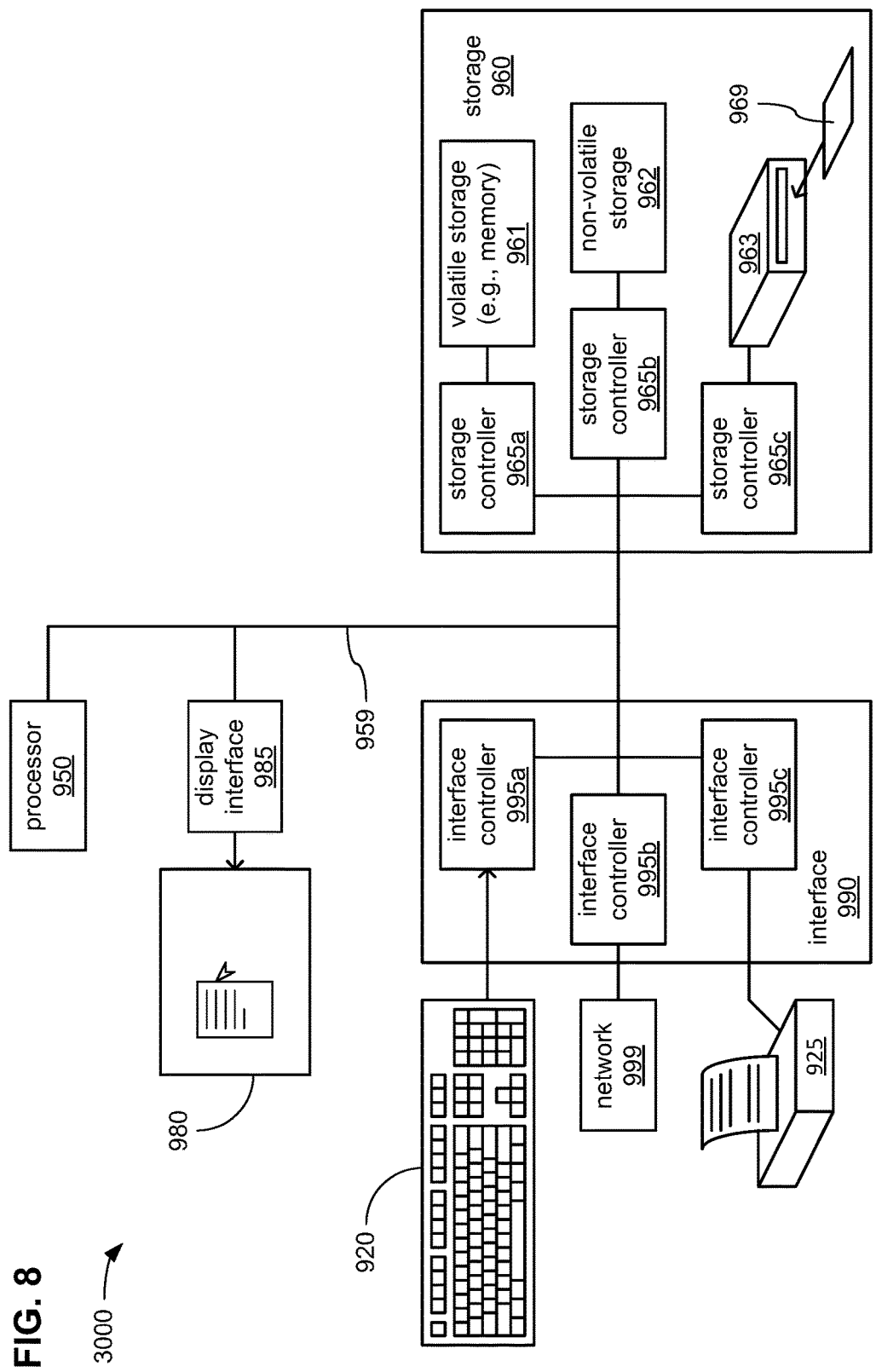
FIG. 8 illustrates an example implementation of a processing architecture for use in a communication system according to at least some embodiments.

FIG. 8 illustrates an example processing architecture according to some implementations disclosed herein. More specifically, various aspects and/or portions of the processing architecture 3000 (or variants thereof) may be implemented as part of one or more of the devices 100 and 300. It should be noted that components of the processing architecture 3000 are given reference numbers in which the last two digits correspond to the last two digits of reference numbers of at least some of the components earlier depicted and described as part of the devices 100 and 300. This is done as an aid to correlating components of each.

As depicted, in implementing the processing architecture 3000, a device includes at least a processor 950, a storage 960, an interface 990 to other devices, and a coupling 959. As will be explained, depending on various aspects of a device implementing the processing architecture 3000, including its intended use and/or conditions of use, such a device may further include additional components, such as without limitation, a display 980 and/or a display interface 985.

The coupling 959 includes one or more buses, point-to-point interconnects, transceivers, buffers, crosspoint switches, and/or other conductors and/or logic that communicatively couples at least the processor 950 to the storage 960. With the processor 950 being so coupled by coupling 959, the processor 950 is able to perform the various ones of the tasks described at length, above, for whichever one(s) of the aforedescribed devices implement the processing architecture 3000. Coupling 959 may be implemented with any of a variety of technologies or combinations of technologies by which commands and/or data are optically and/or electrically conveyed. Further, at least portions of coupling 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor 950 (corresponding to one or more of the processors 150 and 350) may include any of a wide variety of commercially available processors, employing any of a wide variety of technologies and implemented with one or more cores physically combined in any of a number of ways.

As previously discussed, the storage 960 (corresponding to one or more of the storages 160 and 360) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between devices). This depiction of the storage 960 as including multiple distinct types of storage is in recognition of the commonplace use of more than one type of storage device in devices in which one type provides relatively rapid reading and writing capabilities enabling more rapid manipulation of data by the processor 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969. The machine-readable storage medium 969, with executable instructions stored thereon, may be an example of a product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a device at different times to store executable routines and/or data. Thus, a routine including a sequence of instructions to be executed by the processor 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor 950 as that routine is executed.

As previously discussed, the interface 990 (which may correspond to one or more of the network interfaces 190 and 390) may employ any of a variety of communications technologies corresponding to any of a variety of communications technologies that may be employed to communicatively couple a device to one or more other devices. Again, one or both of various forms of wired or wireless communications may be employed to enable the processor 950 to interact with input/output devices (e.g., the depicted example keyboard 920 or printer 925) and/or other devices, where such interaction may be through a network (e.g., the network 999) or an interconnected set of networks. In recognition of the often greatly different character of multiple types of timings and/or protocols that must often be supported by any one device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a device is communicatively coupled to (or actually incorporates) a display (e.g., the depicted example display 980, which may correspond to the display 180), such a display may be based on any of a variety of technologies to visually present information. By way of example, technologies employing the selective emission, selective reflection and/or selective blockage of light may be used, including and not limited to, liquid-crystal display (LCD), electroluminescent (EL), plasma, light-emitting diode (LED), cathode-ray tube (CRT), matrix of light bulbs, etc. The display 980 may be implemented as a television, monitor of a computer system, a projector, a billboard, etc.

Also, where a device is communicatively coupled to (or actually incorporates) a display, such a device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the display 980 may make use of timings and/or protocols that conform to any of a variety of industry standards, including without limitation, any of a variety of analog video interfaces, Digital Video Interface (DVI), DisplayPort, etc.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method to enable sign language communication through communication devices, the method comprising:
    receiving, by a processor, images of first sign language gestures captured by a camera of a first communication device;
    converting, by the processor, the first sign language gestures into first text using training data stored within a storage of the first communication device, wherein the training data is generated at least from a corrected interpretation of a training sequence of sign language gestures;
    transmitting the first text to a second communication device;
    receiving second text from the second communication device; and
    converting, by the processor, the second text into images of second sign language gestures made by an avatar, wherein the images of the second sign language gestures comprise motion video animation generated from a library of sequences of poses that, when presented in sequence at a predetermined frame rate, provide animated movement of the avatar forming sign language gestures.

2. The computer-implemented method of claim 1, the method further comprises:
    operating the camera to capture the images of the first sign language gestures; and
    presenting the images of the second sign language gestures on a display of the first communication device.

3. The computer-implemented method of claim 2, further comprising generating the training data that correlates third sign language gestures to the corrected interpretation of the third sign language gestures, wherein the generating the training data comprises:
    operating the camera to capture images of the third sign language gestures;
    interpreting the third sign language gestures;
    receiving, at the first communication device, the corrected interpretation of the third sign language gestures; and
    storing the training data within the storage of the first communication device for use in the conversion of the first sign language gestures into the first text.

4. The computer-implemented method of claim 1, further comprising:
    receiving, by the processor, first speech captured at the second communication device;
    converting, by the processor, the first speech into third text; and
    converting, by the processor, the third text into images of third sign language gestures made by the avatar.

5. The computer-implemented method of claim 4, further comprising:
    converting, by the processor, the first sign language gestures into second speech; and
    transmitting the second speech to the second communication device.

6. The computer-implemented method of claim 1, the method further comprises:
    receiving the images of the first sign language gestures from the first communication device via a network; and
    transmitting the images of the second sign language gestures to the first communication device via the network to enable presentation of the images of the second sign language gestures on a display of the first communication device.

7. The computer-implemented method of claim 6, further comprising:
    receiving, at a connection server, a request from one of the first communication device and the second communication device to communicate with another of the first communication device and the second communication device;
    receiving, at the connection server, indications from the first communication device that the first communication device is operated by an operator who uses sign language and that the first communication device comprises the camera and the display; and
    in response to the request and the indications, routing communications between the first and second communication devices, performing the conversion from the first sign language gestures into the first text at the connection server, and performing the conversion from the second text to the second sign language gestures at the connection server.

8. The computer-implemented method of claim 6, further comprising:
    receiving, at a connection server, indications from each communication device of a plurality of communication devices that each communication device of the plurality of communication devices is associated with an organization and that each communication device of the plurality of communication devices is operated by an operator who does not use sign language;
    receiving, at the connection server, a request from the first communication device to communicate with a communication device of the plurality of communication devices;

receiving, at the connection server, indications from the first communication device that the first communication device is operated by an operator who uses sign language and that the first communication device comprises the camera and the display;

determining that none of the communication devices of the plurality of communication devices is operated by an operator who uses sign language; and in response to the request, the indications and the determination, selecting a communication device from among the plurality of communication devices that is indicated as available and operated by an available operator as the second communication device and routing communications between the first communication device and the selected communication device.

9. A non-transitory machine-readable medium with instructions stored thereon that, when executed by a processor, cause the processor to:

receive images of first sign language gestures captured by a camera of a first communication device;

convert the first sign language gestures into first text using training data, wherein the training data is based on a training sequence of sign language gestures and includes a corrected interpretation of the training sequence of sign language gestures;

transmit the first text to a second communication device;

receive second text from the second communication device; and convert the second text into images of second sign language gestures made by an avatar, wherein the images of the second sign language gestures comprise motion video animation generated from a library of sequences of poses that, when presented in sequence at a predetermined frame rate, provide animated movement of the avatar forming sign language gestures.

10. The non-transitory machine-readable medium of claim 9, wherein the processor is further caused to:

operate the camera to capture the images of the first sign language gestures; and present the images of the second sign language gestures on a display of the first communication device.

11. The non-transitory machine-readable medium of claim 10, wherein the processor is further caused to generate the training data that correlates third sign language gestures to the corrected interpretation of the third sign language gestures, wherein the processor is further caused to:

operate the camera to capture images of the third sign language gestures;

interpret the third sign language gestures;

receive the corrected interpretation of the third sign language gestures; and store the training data within the storage of the first communication device for use in the conversion of the first sign language gestures into the first text.

12. The non-transitory machine-readable medium of claim 9, wherein the processor is further caused to:

receive first speech captured at the second communication device;

convert the first speech into third text; and convert the third text into images of third sign language gestures made by the avatar.

13. The non-transitory machine-readable medium of claim 12, wherein the processor is further caused to:

convert the first sign language gestures into second speech; and transmit the second speech to the second communication device.

14. The non-transitory machine-readable medium of claim 9, wherein the processor is further caused to:

receive the images of the first sign language gestures from the first communication device via a network; and transmit the images of the second sign language gestures to the first communication device via the network to enable presentation of the images of the second sign language gestures on a display of the first communication device.

15. The non-transitory machine-readable medium of claim 14, wherein the processor is further caused to:

receive a request from one of the first communication device and the second communication device to communicate with another of the first communication device and the second communication device;

receive indications from the first communication device that the first communication device is operated by an operator who uses sign language and that the first communication device comprises the camera and the display; and in response to the request and the indications, route communications between the first and second communication devices, perform the conversion from the first sign language gestures into the first text, and perform the conversion from the second text to the second sign language gestures.

16. An apparatus to enable sign language communication through communication devices, the apparatus comprising:

a processor; and a storage coupled to the processor to store instructions, that when executed by the processor cause the processor to:

receive images of first sign language gestures captured by a camera of a first communication device;

convert the first sign language gestures into first text using training data, wherein the training data is based on a training sequence of sign language gestures and includes a corrected interpretation of the training sequence of sign language gestures;

transmit the first text to a second communication device;

receive second text from the second communication device; and convert the second text into images of second sign language gestures made by an avatar, wherein the images of the second sign language gestures comprise motion video animation generated from a library of sequences of poses that, when presented in sequence at a predetermined frame rate, provide animated movement of the avatar forming sign language gestures.

17. The apparatus of claim 16, wherein the processor is further caused to:

operate the camera to capture the images of the first sign language gestures; and present the images of the second sign language gestures on a display of the first communication device.

18. The apparatus of claim 16, wherein the processor is further caused to:

receive first speech captured at the second communication device;

convert the first speech into third text; and convert the third text into images of third sign language gestures made by the avatar.

19. The apparatus of claim 18, wherein the processor is further caused to:

convert the first sign language gestures into second speech; and transmit the second speech to the second communication device.

20. The apparatus of claim 16, wherein the processor is further caused to:

receive the images of the first sign language gestures from the first communication device via a network; and transmit the images of the second sign language gestures to the first communication device via the network to enable presenting of the images of the second sign language gestures on a display of the first communication device.

* * * * *